(12) United States Patent
Sato et al.

(10) Patent No.: US 6,882,845 B2
(45) Date of Patent: Apr. 19, 2005

(54) AUTONOMOUS ZONE FORMING COMMUNICATION DEVICE AND AUTONOMOUS ZONE FORMING METHOD

(75) Inventors: Hijin Sato, Yokohama (JP); Narumi Umeda, Yokohama (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 499 days.

(21) Appl. No.: 09/926,262

(22) PCT Filed: Feb. 2, 2001

(86) PCT No.: PCT/JP01/00749

§ 371 (c)(1),
(2), (4) Date: Oct. 3, 2001

(87) PCT Pub. No.: WO01/58193

PCT Pub. Date: Aug. 9, 2001

(65) Prior Publication Data

US 2003/0036409 A1 Feb. 20, 2003

(30) Foreign Application Priority Data

Feb. 3, 2000 (JP) ........................................ 2000-026580

(51) Int. Cl.[7] .............................................. H04B 17/00
(52) U.S. Cl. ....................... 455/446; 455/453; 455/522; 455/502; 455/456.1; 455/561; 455/422.1; 342/118; 342/456; 342/458
(58) Field of Search .................................. 455/446, 436, 455/440, 442, 443, 453, 422.1, 424, 500, 502, 513, 515, 67.11, 67.16, 561; 370/330, 331, 335, 342; 375/130, 133

(56) References Cited

U.S. PATENT DOCUMENTS

| | | | |
|---|---|---|---|
| 4,435,840 A | | 3/1984 | Kojima et al. |
| 5,499,395 A | | 3/1996 | Doi et al. |
| 5,584,049 A | * | 12/1996 | Weaver et al. ............... 455/524 |
| 5,898,682 A | | 4/1999 | Kanai |
| 6,333,923 B1 | * | 12/2001 | Maki et al. .................. 370/330 |
| 6,496,699 B1 | * | 12/2002 | Benveniste ............... 455/452.1 |
| 6,529,491 B1 | * | 3/2003 | Chang et al. ................ 455/447 |
| 6,701,132 B1 | * | 3/2004 | Fukuzawa et al. .......... 455/561 |
| 2001/0016498 A1 | * | 8/2001 | Kang et al. .................. 455/453 |
| 2002/0065107 A1 | * | 5/2002 | Harel et al. .................. 455/561 |

FOREIGN PATENT DOCUMENTS

| | | | | |
|---|---|---|---|---|
| JP | 57-210739 | 12/1982 | | |
| JP | 9-163435 | 6/1997 | | |
| JP | 9-163443 | 6/1997 | | |
| JP | 2002112317 A | * 4/2002 | ............ | H04Q/7/34 |
| KR | 1999-0061231 | 7/1999 | | |

* cited by examiner

Primary Examiner—David Hudspeth
Assistant Examiner—Kamran Afshar
(74) Attorney, Agent, or Firm—Oblon, Spivak, McClelland, Maier & Neustadt, P.C.

(57) ABSTRACT

An autonomous zone forming method of autonomously forming a zone which is a service area of a base station in a wireless communication system having the base station is provided. In the method, it is detected that a zone is newly formed around the base station, and a zone which is the service area of the base station is autonomously changed according to a newly formed zone. When determining the zone, receive quality of a signal received from a surrounding base station is used. In addition, a congestion state of a surrounding base station of the base station is detected, and a zone which is the service area of the base station is enlarged to the direction of the surrounding base station according to the congestion state.

24 Claims, 10 Drawing Sheets

COLLECT ENVIRONMENT
INFORMATION BY MEASUREMENT

AUTONOMOUS ZONE FORMING COMMUNICATION DEVICE AND AUTONOMOUS ZONE FORMING METHOD

TECHNICAL FIELD

The present invention relates to a technique to form a zone which is an area in which a wireless terminal can perform communication when a wireless base station provides a service in a wireless communication system which includes the wireless base station and the wireless terminal.

BACKGROUND ART

In a conventional wireless communication system, size of the zone of the wireless base station is decided at a design stage. When a service starts to be provided, the service is provided by the same zone. Factors for determining the zone at the design stage are transmission power, tilt of antennas and the like. The size of the zone can be changed by changing the factors.

Figure 1:
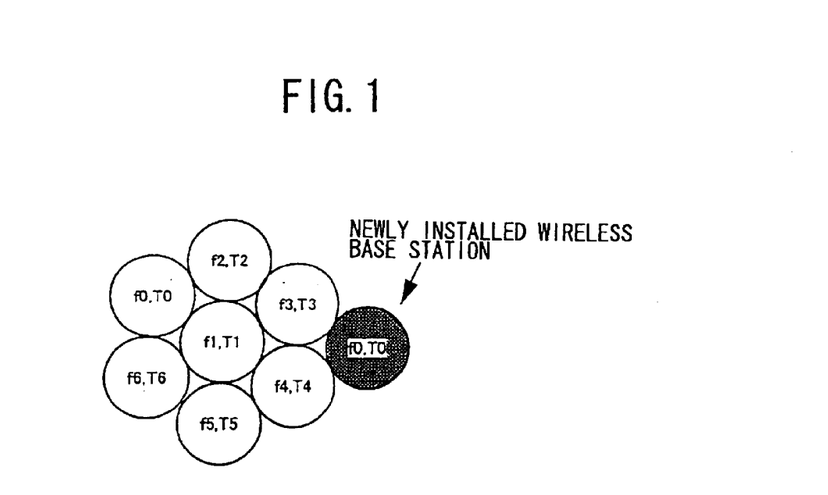
FIG. 1 is a figure for explaining a conventional technique.
Figure 2:
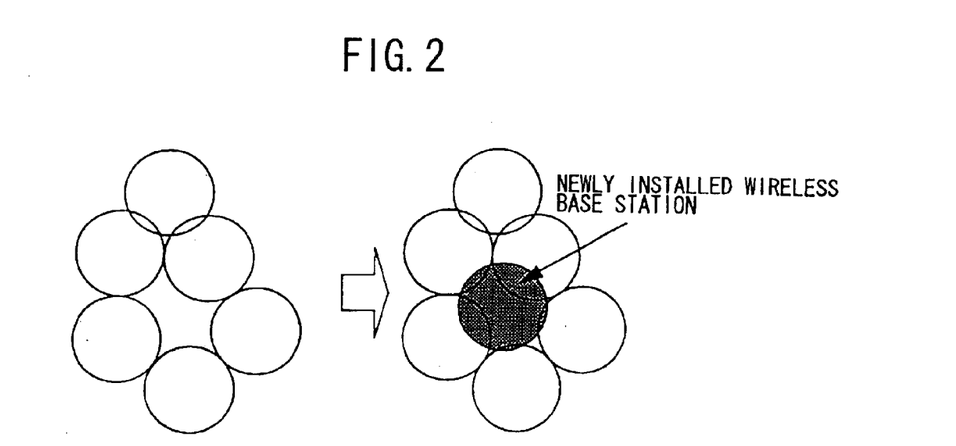
FIG. 2 is a figure for explaining a conventional technique.

FIGS. 1 and 2 show a conventional technique. As shown in FIG. 1, a newly installed wireless base station which is newly mounted searches frequencies and perch channels of surrounding wireless base stations, and determines carrier of the base station (f0) or transmission timing (T0) of perch channel. In this case, the size of the zone is predetermined. In addition, as shown in FIG. 2, the service is provided by keeping the predetermined size of the service area without considering service status of the surrounding wireless base stations.

As mentioned above, as for the conventional wireless base station, transmission power and conditions on the antenna are predetermined at the design stage. When initially setting up the wireless base station, as main operation, surrounding conditions such as transmission power of surrounding base stations are measured. On the basis of the surrounding conditions, the timing broadcasted system information and the carrier are determined as notification information. When the wireless base station detects abnormality of synchronization state with surrounding wireless base stations, or, when the wireless base station changes transmission timing of the wireless base station itself due to effect of perch channel of other base stations, the system needs to be reset and rebooted, or quasi-normal operation is necessary for re-synchronization.

In the above-mentioned conventional technique, in order to change an area for providing a service, it is necessary to change setting of transmission power of the wireless base station after stopping the service, or it is necessary to change the wireless base station itself. In addition, since transmission power and antenna condition should be changed by hand, analysis and the like should be performed before changing the transmission power and the antenna condition in order to forming a zone in consideration of various conditions such as installation state of surrounding wireless base stations. In addition, since the work for changing the transmission power and the antenna condition needs to be done every time when environment such as surrounding base stations, traffic variations or the like is changed, high cost is required for maintenance.

In addition, when wireless base stations are placed successively, traffic condition varies from one base station to another. There are some wireless base stations where traffic is congested. On the other hand, there is a case where there is no traffic congestion in adjacent base stations so that there are available channels. Since there is a case where a user which is in the edge of a service area may want to continue communication even when quality degradation may occur, it is desirable that the service area and another service area of an adjacent wireless base station are overlapped. However, if the service areas are always overlapped regardless of traffic conditions, frequency utilization efficiency is lowered.

DISCLOSURE OF THE INVENTION

The present invention is contrived in light of the above-mentioned problem, and it is an object of the present invention to determine and change a zone which is a service area of a wireless base station.

To achieve the above-mentioned object, the present invention can be configures as follows.

The present invention is a communication apparatus in a wireless communication system having a base station, including:

a part which autonomously forms a zone which is a service area of the base station.

The present invention can be also configured as follows.

The present invention is a communication apparatus in a wireless communication system having a base station, including:

a part which detects that a zone is newly formed around the base station; and a part which autonomously changes a zone which is a service area of the base station according to a newly formed zone.

According to the present invention, since the service area can be autonomously determined and changed, it becomes unnecessary to change transmission power and antenna condition of the wireless base station after performing analysis and the like specially. Thus, cost for maintenance can be reduced.

In the above configuration, the communication apparatus includes:

a part which detects a congestion state of a surrounding base station of the base station; and a part which enlarges a zone which is the service area of the base station according to the congestion state to the direction of the surrounding base station.

According to the present invention, a service can be provided for a part of wireless terminals connected to an adjacent wireless base station so that congestion can be relieved. Thus, a service can be started for wireless terminals waiting the service and throughput for wireless terminals in which a service is being provided can be improved.

In the above configuration, the communication apparatus includes:

a part which determines the zone of the base station on the basis of receive quality of a signal received from a surrounding base station of the base station.

According to the present invention, since the receive quality of a signal received from the surrounding base station, various values such as receive power, transmission delay, bit error rate, packet error rate and the like can be used for zone formation. Thus, the zone can be determined accurately.

In the above configuration, the communication apparatus includes:

a part which measures received power or transmission delay of a signal sent to the base station from a surrounding base station;

a part which calculates a distance between the base station and the surrounding base station on the basis of a result of the measurement;

a part which determines the zone which is the service area of the base station on the basis of the result of calculation.

By using the received power or the transmission delay, a distance between base stations can be easily obtained.

In the above configuration, the communication apparatus includes:

a part which measures a bit error rate or a packet error rate from information sent from the surrounding base station to the base station; and a part which determines the zone which is the service area of the base station according to a result of the measurement.

By using the bit error rate or the packet error rate, a distance to which a service can be provided can be determined with respect to a threshold of a service quality for example.

In the above configuration, the communication apparatus includes:

a part which detects a service content of a surrounding base station by the base station; and a part which determines the zone which is the service area of the base station such that the same services as the service do not overlap in the same service area.

According to the present invention, a zone can be determined without overlaps of service areas.

In the above configuration, the communication apparatus includes:

a part which autonomously determines which pattern is used in which a plurality of patterns of the zone which is the service area of the base station are prepared.

By preparing the patterns, a zone can be determined quickly

In the above configuration, the communication apparatus includes:

a part which determines the zone of the base station on the basis of a first distance between the base station and a zone edge of a surrounding base station, and a second distance between the base station and a zone edge of the base station when transmission power of the base station is smallest. Accordingly, an efficient zone can be determined.

In the above configuration, the communication apparatus includes:

a part which determines the zone of the base station on the basis of a distance between the base station and a zone edge of a surrounding base station in which the first distance becomes minimum in surrounding base stations except particular surrounding base stations in which a value obtained by subtracting the first distance from the second distance becomes larger than a predetermined value.

According to the present invention, overlaps can be decreased and covered area can be enlarged in zone formation. Especially, the effect is large when a directional antenna in which the beam width is wide is used.

In the above configuration, the communication apparatus includes:

a part which determines the zone of the base station as a zone formed when transmission power of the base station is minimum if there is a surrounding base station in which a value obtained by subtracting the first distance from the second distance is larger than a predetermined value.

According to the present invention, overlaps can be decreased and covered area can be enlarged in zone formation. Especially, the effect is large when a directional antenna in which the beam width is narrow is used.

In the above configuration, the communication apparatus includes:

a part which determines the zone of the base station on the basis of a distance between the base station and a zone edge of a surrounding base station in which the first distance becomes minimum in surrounding base stations except particular surrounding base stations in which a value obtained by subtracting the first distance from the second distance becomes larger than a predetermined value, when beam width of an antenna used by the base station exceeds a predetermined angle; and a part which determines the zone of the base station as a zone formed when transmission power of the base station is minimum if there is a surrounding base station in which a value obtained by subtracting the first distance from the second distance is larger than a predetermined value, when beam width of an antenna used by the base station does not exceed a predetermined angle.

In the above configuration, the communication apparatus includes:

a part which obtains the first distance as a value calculated by subtracting the size of a zone of the surrounding base station from a distance between the base station and the surrounding base station;

and obtains the distance between the base station and the surrounding base station from received power of a signal at the base station sent from the surrounding base station and transmission power of the surrounding base station.

The present invention can also be configured as follows.

The present invention is a wireless communication system including a plurality of base stations, the wireless communication system including at least a particular base station as only a part of the plurality of base stations, the particular base station including a part which autonomously forms a zone of a service area of the particular base station on the basis of receive quality of signals received from surrounding base stations.

According to the present invention, flexibility can be provided for wireless base stations in which the zones are determined fixedly. Other objects, features and advantages of the present invention will become more apparent from the following detailed description when read in conjunction with the accompanying drawings.

PREFERRED EMBODIMENTS FOR CARRYING OUT THE INVENTION

Figure 3:
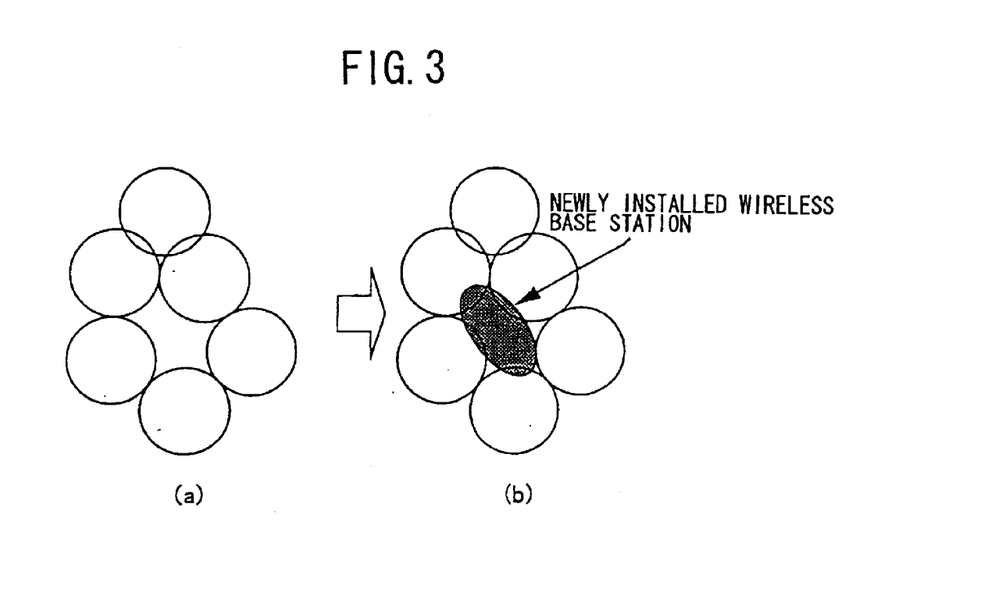
FIG. 3 is a figure for explaining an outline of the present invention.

FIG. 3 is a figure for explaining an outline of the present invention. FIG. 3(a) shows service areas where some wireless base stations have already started services. According to the present invention, when installing a wireless base station (newly installed wireless base station) for providing a service in an area which is not covered by the service areas, the newly installed wireless base station autonomously determines the service area so that the service area covers only the uncovered area as shown in FIG. 3(b).

The present invention can be carried out by using sector antennas or adaptive array antennas. First, an example in which the sector antenna is used will be described. When booting up the wireless base station, the wireless base station searches for perch channels of surrounding wireless base stations by using the sector antennas.

At this time, the search is performed by each sector antenna and receive power of each surrounding wireless base station is stored for each sector antenna. When a surrounding wireless base station broadcasts transmission power by using the perch channel, the wireless base station estimates the service area of the surrounding wireless base station on the basis of the broadcasted transmission power and receive power of a receive signal. Since the receive power attenuates by distance exponentiation of transmission power, it is relatively easy to estimate the service area to the direction where the new wireless base station exists.

By estimating the service area of a surrounding wireless base station to the direction where the new wireless base station exists, it becomes possible that the service area of the new wireless base station is calculated for each sector and transmission power of each sector can be determined. For example, the service area of a sector antenna of the new wireless base station is a distance from a position of the new wireless base station to an edge of the service area of the surrounding wireless base station plus a predetermined distance. After determining the transmission power of the new wireless base station, the new wireless base station broadcasts information of transmission power by the sector by using the perch channel.

Next, an embodiment of the present invention will be described when the antenna of the new wireless base station is the adaptive array antenna.

When starting up the new wireless base station, surrounding base stations are searched. According to the result of the search, incoming directions of signal of perch channel sent from the surrounding wireless base stations are determined. For this purpose, normal signal processing algorithm of the adaptive array antenna is used. In the normal signal processing of the adaptive array antenna, a beam is formed in the direction where the highest quality signal is received. However, null (a point in which there is no directivity) is formed in the direction where the highest quality signal is received in this case. The perch channel is sent by the form of the beam made here so that the service area is formed autonomously.

The above-mentioned autonomous zone formation can be performed not only when installing the new wireless base station but also when a new zone is formed around a wireless base station. That is, when a new zone is formed around a base station, the base station recognizes the zone by a perch channel and determines and changes a zone of the base station itself in the same way as mentioned above.

Figure 4:
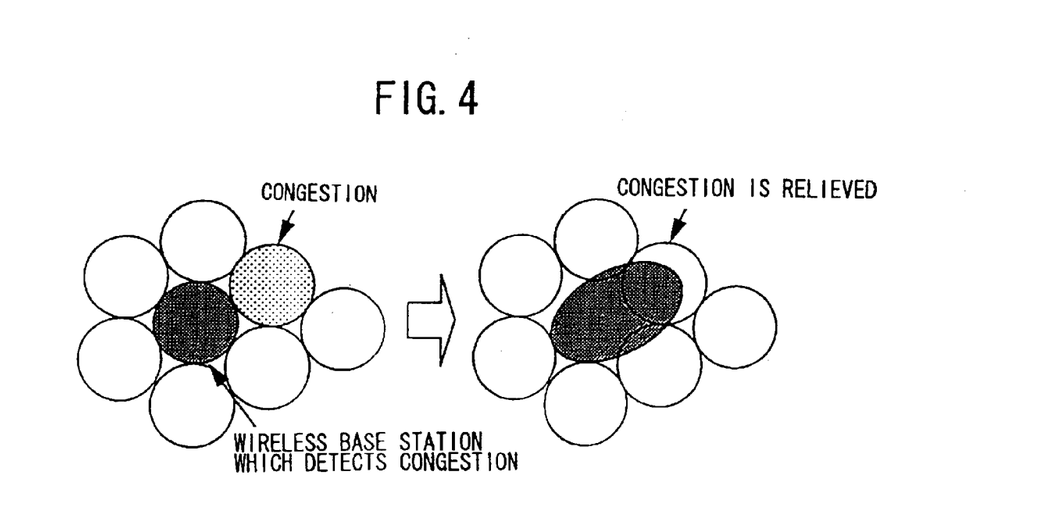
FIG. 4 is a figure for explaining change of a service area according to a congestion state.

FIG. 4 is a figure for explaining that a wireless base station detects that an adjacent base station is in congestion state, and the wireless base station changes the service area according to the congestion state of the adjacent base station such that the base station eases load of the congested adjacent base station. The following operation can be performed in both cases when stating up the wireless base station and when providing a service.

A wireless base station can notify other wireless base stations of capacity used for providing services for wireless terminals, that is, the rate of operation (or congestion state). As for a system of circuit switching base, this can be done only by notifying of the number of whole channels and the number of used channels. As for a packet exchange based system in which traffic for a user changes according to time and wireless resources are used according to the traffic, a wireless base station notifies of sum of available capacities for providing services, the number of wireless terminals which are connected, sum of supporting minimum bandwidths when ensuring minimum bandwidth, usage rate of capacity and the like so that other wireless base stations can determine whether the wireless base station is congested or not. For example, in a wireless base station, when 50% capacities are used for minimum bandwidth ensuring and average usage rate of other capacitates is 30%, the rate of operation of the wireless base station is 80% on average. If the rate of operation of more than 75% is defined as congestion state, the wireless base station is in congestion state. Surrounding wireless base stations can detect this state by receiving the perch channel. When a wireless base station detects the congestion state, the wireless base station controls the service area such that it expands to the direction of congested wireless base station.

In this case, in order to expands the service area to the direction of the congested wireless base station, it is necessary to control the antenna. When using the sector antenna and the adaptive array antenna, these are controlled in the following way. For both antennas, it is necessary to receive the perch channel of surrounding wireless base stations periodically. It is obvious to the person skilled in the art to realize to receive the perch channel of surrounding wireless base stations periodical in a system which synchronizes with surrounding wireless base stations beforehand.

When using the sector antenna, the service area can be expanded by storing sectors where congestion state is detected and increasing the transmission power of the sectors. It can be relatively easily realized to increase the transmission power by a predetermined value for the congested wireless base station.

In addition, it is possible to prepare several levels of transmission powers and to control the levels according to the congestion state. For example, it is possible to increase the transmission power such that service areas are expanded by Xm, Ym and Zm to directions of wireless base stations having rate of operation of 80%, 90% and 100% respectively. In addition, the distance from the wireless base station of congestion state is calculated from the transmission power and the receive power, and the service area of the wireless base station in the congestion state is estimated by the method same as the above-mentioned method. On the basis of the result, it is possible that the service area of a wireless base station which detects the congestion state can be expanded-such that the service area overlaps with the service area of congested base station by a predetermined distance X'm from the edge for covering the service area of the wireless base station of the congestion state. That is, it becomes possible that a service area of an adjacent wireless base station in the congestion state can overlap with a service area of other wireless base station.

When using the adaptive array antenna, changing of the service area can be realized by almost the same method as the above-mentioned method. When detecting a congestion state, the direction, an identifier of the wireless base station of the congestion state (parameters which can be identified uniquely such as ID, or frequency, start timing of a perch channel and the like) and information on the congestion state are stored. Then, on the basis of the information, a beam is formed such that a predetermined area in the area of the congestion state can be covered. In the same way as the sector antenna, the transmission power can be controlled by weighing the transmission power such that the beam changes according to degree of the congestion.

Figure 5:
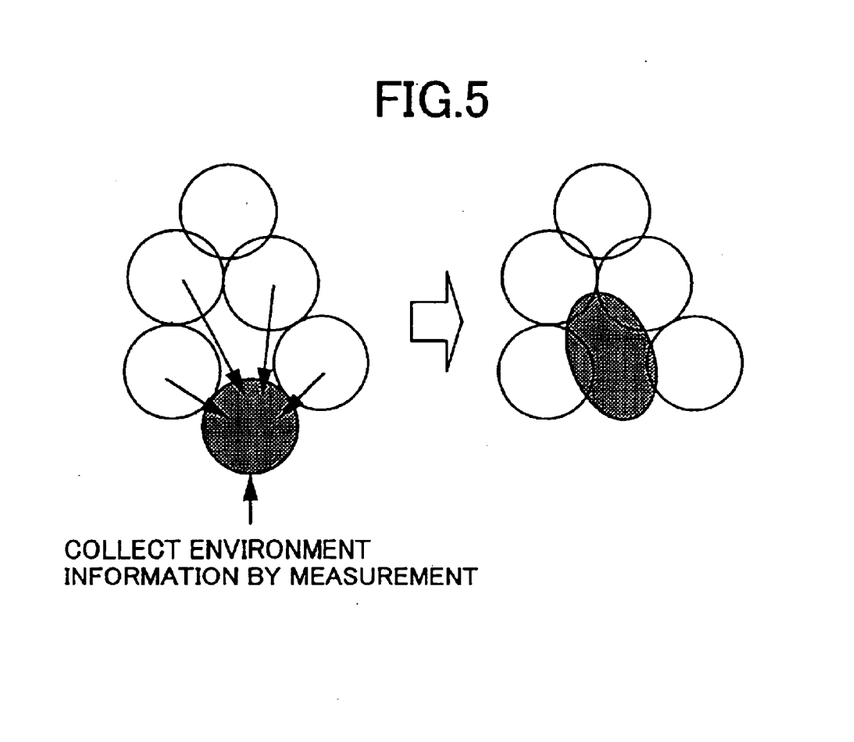
FIG. 5 is a figure for explaining change of a service area on the basis of measurement result of receive signal.

FIG. 5 is a figure for explaining a method for determining a service area of a wireless base station based on quality of a signal sent from an adjacent wireless base station. The method will be described in the following.

First, the wireless base station receives perch channels sent by surrounding wireless base stations and measures the quality. As the receive quality, receive power (also called received power), transmission delay, bit error rate, packet error rate and the like can be measured. The autonomous control method based on the receive power has been described with reference to FIG. 1. A control method based on the transmission delay will be described next.

When the wireless base station is synchronized with the adjacent base station, the transmission delay can be calculated by comparing receive timing of a send signal of the adjacent base station and synchronization timing. Since the transmission delay occurs during space propagation, if the transmission delay is calculated, distance dd between receive and send base stations can be easily calculated. On the basis of the calculated distance dd, half of the distance (dd/2) can be determined as a service area of a new base station, or, on the basis of transmission power of the adjacent base station or the size (k) of a service area, dd-k can be determined as a distance to which service can be provided in the direction of the adjacent base station. This procedure is repeated to whole directions so that distances to which service can be provided in the whole directions are determined. Accordingly, the service area of a new base station can be determined autonomously.

The bit error rate and the packet error rate can be improved when communication distance becomes short. For example, as for a wireless base station, assuming that error rate of a signal from an adjacent base station is G', and a threshold of service quality is G. Since the degree of improvement when the distance is decreased by h meters can be calculated, a distance h' from the wireless base station in which G'=G is satisfied can be calculated. It is possible that h' is set as a distance to which the wireless base station can provide a service, and by repeating this procedure for whole directions, the service areas of the surrounding wireless base stations can be obtained. Thus, the service area of the wireless base station which intends to determine the zone can be determined autonomously.

Figure 6:
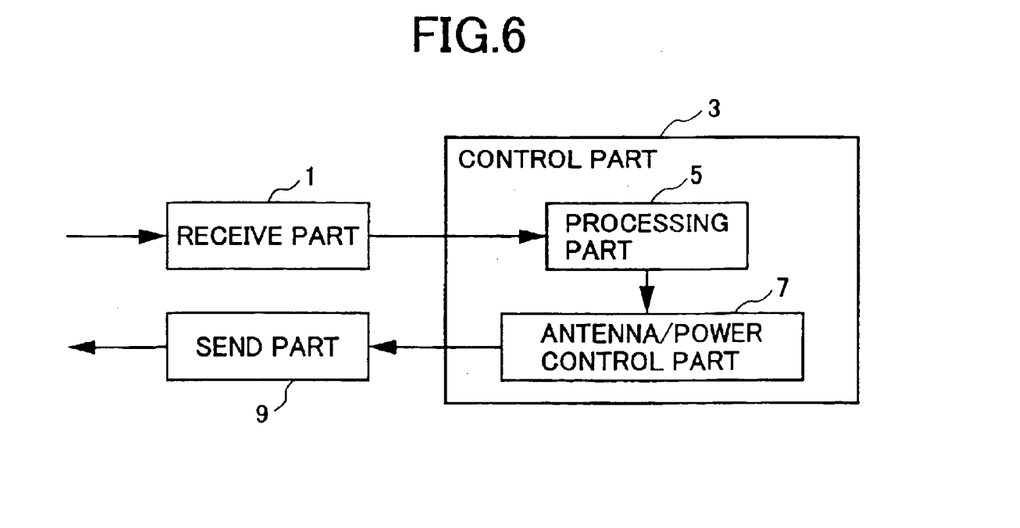
FIG. 6 is a figure showing a configuration of a wireless communication apparatus according to an embodiment of the present invention.

FIG. 6 is a figure showing a configuration of a wireless communication apparatus of the present invention which performs the above-mentioned control. The wireless communication apparatus of the present invention includes a receive part 1 which receives a signal of a surrounding base station, a control part 3 which performs the control based on the control method of the present invention, and a send part 9 which sends a signal. The control part 3 includes a processing part 5 which processes receive information and an antenna/power control part 7 which controls the send part. This wireless communication apparatus is a wireless base station for example.

Figure 7:
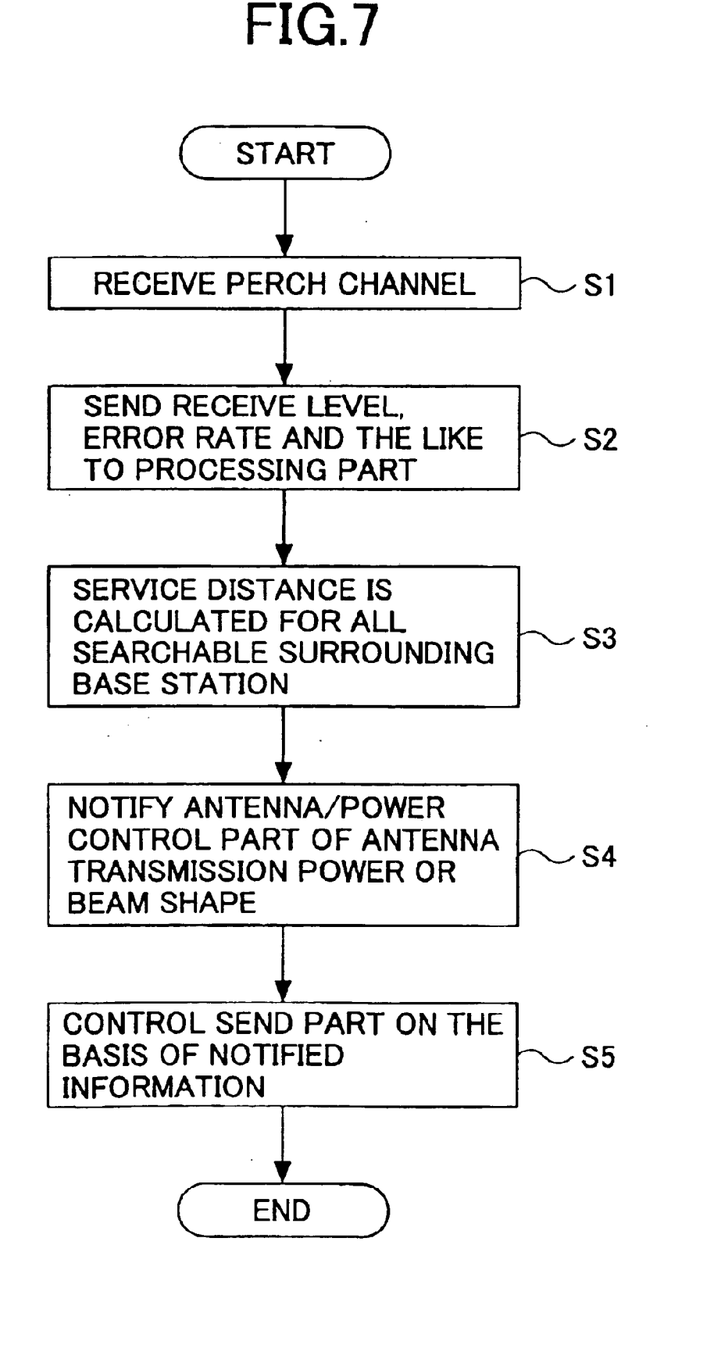
FIG. 7 is a flowchart of operation of a wireless communication apparatus according to an embodiment of the present invention.

The operation of the wireless communication apparatus of the present invention will be described by using a flowchart shown in FIG. 7. The receive part 1 receives a perch channel of the adjacent base station (step S1), and sends receive power, error rate, synchronization information, identifier of the adjacent base station and the like to the processing part 5 (step S2). The perch channel is sent simultaneously. In the processing part 5, a distance between the surrounding base station and the base station and a service distance of the surrounding base station are calculated, a service distance of the particular base station is calculated. This procedure is performed for all searchable surrounding base stations so that transmission power of antenna or the shape of the beam is determined for all directions (step S3;). Concrete examples of methods of determining the service distance (zone) of a base station will be described later. This result is notified to the antenna/power control part 7 (step S4). The antenna/power control part 7 controls the send part 9 such that a send signal can be generated based on this notification (step S5).

The communication apparatus of the present invention can be configured as a wireless base station. However, it is not necessarily the wireless base station. For example, the control part 3 may not be within the wireless base station. For example, it may be in the after-mentioned control station (for example, configured as a computer system having a communication function).

When determining the size of the zone of the wireless base station from the size of the zone of the surrounding base station by the above-mentioned method, there are various distances between the surrounding base station and the target base station. For example, when distance between the surrounding base station and the particular base station which is newly installed is uniform for every directions, the size of the zone of the particular station can be easily obtained by using a distance between the particular station and the zone edge of a representative surrounding base station.

Figure 8:
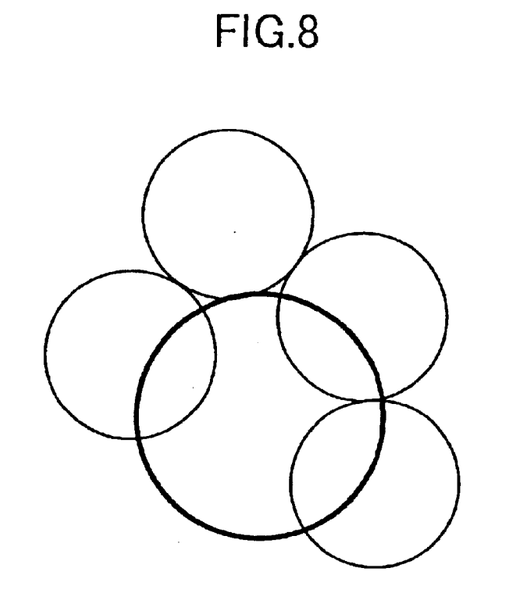
FIG. 8 is a figure for explaining a problem in determining a zone.
Figure 9:
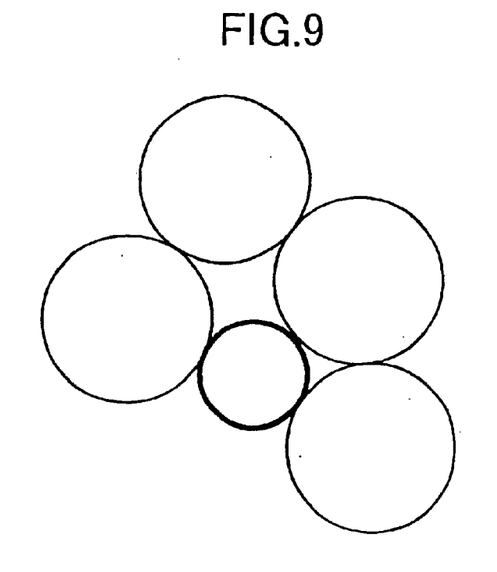
FIG. 9 is a figure for explaining a problem in determining a zone.

However, when determining the zone edge of the particular base station such that the zone edge of the particular base station comes in contact with a zone edge of a surrounding base station which zone edge is farthest from the particular station in surrounding base stations, there is a possibility that the area which overlaps with other surrounding base stations become large as shown in FIG. 8. On the other hand, when determining the zone edge of the particular station such that the zone edge of the particular station comes in contact with a zone edge of a surrounding base station which zone edge is nearest from the particular station in surrounding base stations, uncovered area becomes large as shown in FIG. 9. Accordingly, when variation of the distance from the zone edge of the surrounding base station is large, it becomes difficult to form a zone efficiently. In the following, a method for enlarging the covering area which decreases overlapping will be described as a method of determining a zone (service distance of the particular station).

Figure 10:
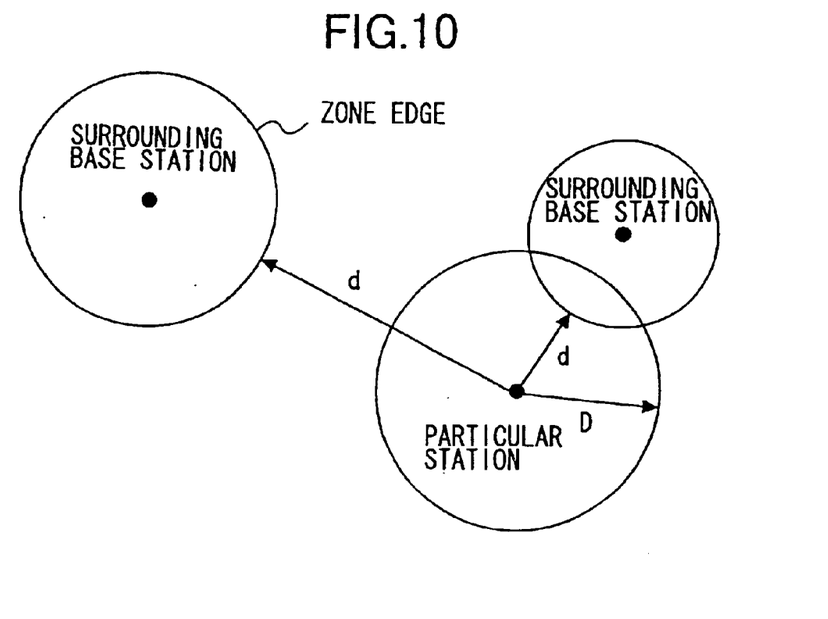
FIG. 10 is a figure for explaining a first example of a zone determining method.

A first example will be described with reference to FIG. 10.

As mentioned before, the zone of the particular station is formed on the basis of the relationship between the service area of the particular station and the service area of the surrounding base station. In the following, a surrounding base station which becomes a consideration subject for zone forming will be called a subject surrounding base station.

A distance D between a edge of a smallest zone which the particular station can form and the particular station is compared with a distance d between the particular station and a zone edge of a surrounding base station. Then, when D>d or D−d>K (K is a predetermined value) is satisfied, the surrounding base station is excluded from the subject surrounding base station. By excluding the surrounding base station which satisfies D>d or D−d>K (K is a predetermined value) from the subject surrounding base station, relationship between the particular station and surrounding base stations which are apart from the particular station to some extent other than near surrounding base stations can be considered. Accordingly, the zone can be formed such that the covering area is enlarged.

Figure 11:
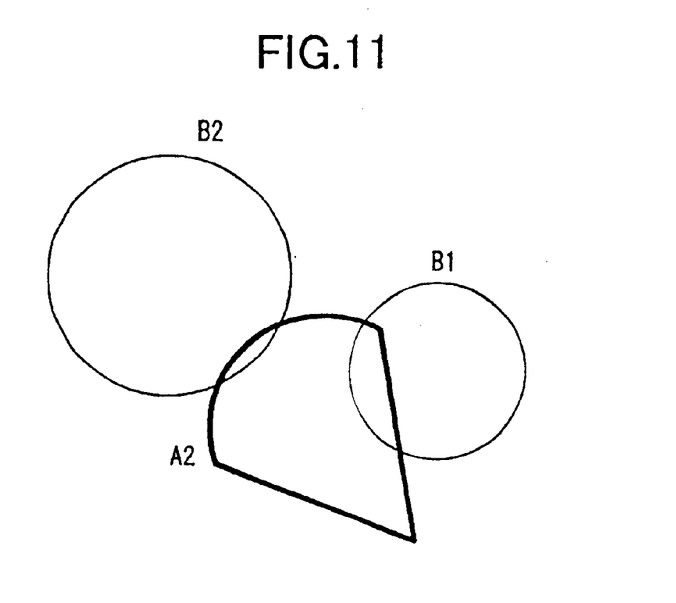
FIG. 11 is a figure for explaining effect of the first example of the zone determining method.

When using the directional antenna in FIG. 11, it can be considered that the antenna is not headed in the direction of a nearest base station. In this case, there is a possibility that many areas are uncovered when the zone is formed in accordance with a zone edge of the nearest surrounding base station. However, by using the above method, when a surrounding base station has a service area within the inside of the smallest zone which the particular station can form, the surrounding base station can be treated as not in the direction of the antenna of the particular station. Therefore, the possibility that many area are uncovered decreases. In the case where overlapping distance is considered, when D−d>K (K is a predetermined value) is satisfied, the surrounding base station is excluded from the subject surrounding base station.

By determining the zone edge of the particular station in accordance with a zone edge of the nearest surrounding base station in the subject surrounding base stations, the zone can be formed by decreasing overlapping.

Figure 12:
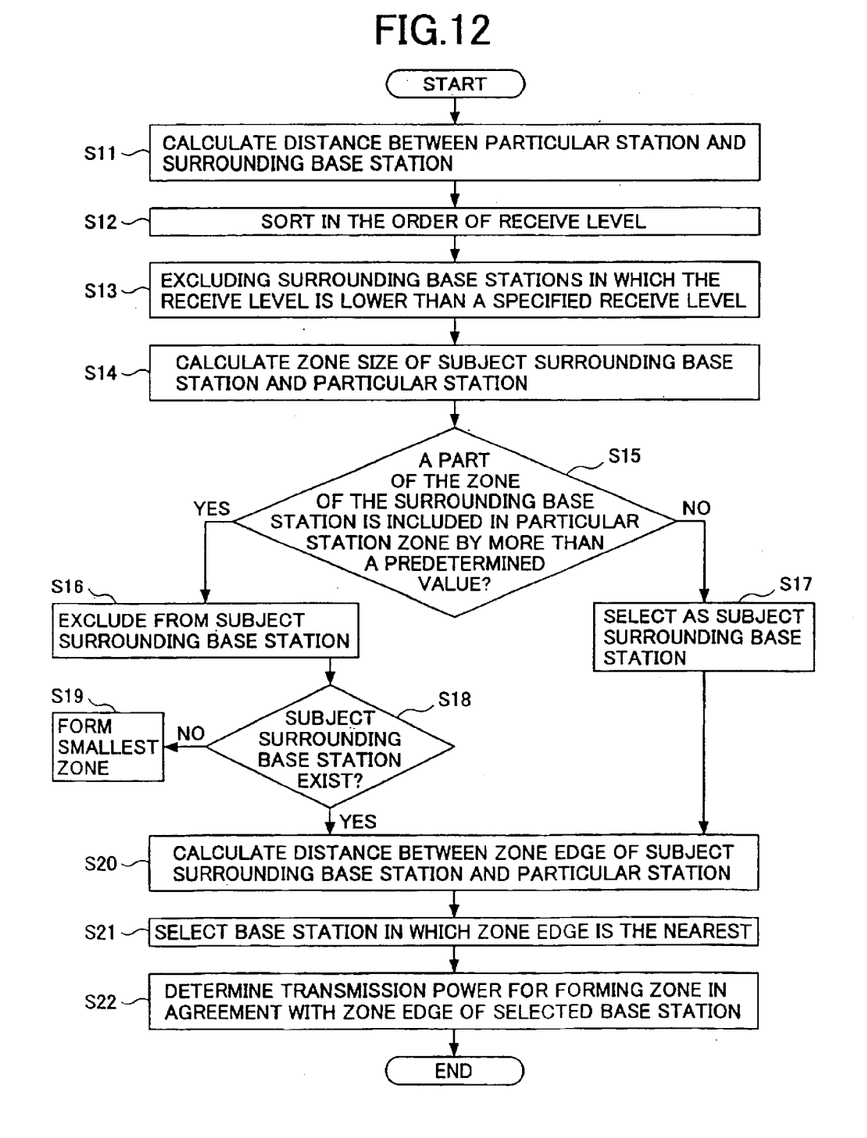
FIG. 12 is a flowchart of a first example of the zone determining method.

FIG. 12 shows a detailed flowchart when a zone is determined by the above-mentioned method. The process shown here is executed in the control part in a base station, in an after-mentioned control station and the like.

First, distances R between the particular station and surrounding base stations are calculated from receive powers and transmission powers of the surrounding base stations measured in the particular station (step S11). Surrounding base stations for which the distances are calculated will be called "subject surrounding base stations in the first stage". Next, the surrounding base stations are sorted in decreasing order of the receive power (step S12). Then, surrounding base stations in which the receive power is lower than a predetermined level are excluded from the subject surrounding base station (step S13). This process is performed for removing surrounding base stations which are apart form the particular station to some extent from considering subject.

Next, distances (zone size B) from the subject surrounding base stations in the first stage to the zone edges are calculated. The distance can be calculated from the transmission power of the base station and power level at the zone edge defined as the service area (zone). As the transmission power of the base station, a current transmission power or a maximum transmission power which can be transmitted can be used. Next, a distance D (smallest zone size) to the smallest zone edge of the particular station is calculated from smallest power which can be sent (step S14). This is defined as a tentative particular station zone edge. The distance to the tentative particular station zone edge may be zero. Then, it is judged whether the zone of the surrounding base station extends to the inside of the particular station zone from relationship of the distance R between the particular station and the subject surrounding base station, the zone size B of the subject surrounding base station in the first stage and the particular station zone size D (step S15). That is, when a part of the zone of the surrounding base station is included in the particular station zone by more than a predetermined value, the surrounding base station is excluded from the subject surrounding base station (step S16). On the other hand, when a part the zone of the surrounding base station is not included in the particular station zone by more than a predetermined value, the surrounding base station is remained as the subject surrounding base station (step S17). Accordingly, the subject surrounding base stations are determined.

The zone of the surrounding base station being included within the particular station zone edge means that (D+B)−R, calling (D+B)−R as an overlapping distance, becomes positive. There is a case where the overlapping distance needs to be more than a predetermined value for handover and the like. Therefore, the overlapping distance can be considered by setting a predetermined value as a necessary overlapping distance, and by treating a surrounding base station as the subject surrounding base station when the value of (D+B)−R does not exceeds the predetermined value (K). Since d in the before-mentioned equation D>d can be represented by R−B, D>d is equivalent to that D−(R−B) is positive, that is, D+B−R is positive.

After removing the base stations in which a part of the zone is included in the particular station zone more than a predetermined value from the subject surrounding base station, when there are one or more remaining subject surrounding base stations, the process goes to the next step. When there is no subject surrounding base station, the particular station forms the smallest zone which the particular station can form by the smallest power (step S18, S19).

After determining the subject surrounding base stations, a distance between the zone edge of each subject surrounding base station and the particular station is calculated (step S20). This can be obtained by the above-mentioned R−B. By sorting obtained values, a subject surrounding base station in which R−B is the smallest, that is, the zone edge is the nearest from the particular station is selected (step S21). Then, the zone of the particular base station is enlarged from the zone edge of the selected base station by the overlapping distance (K), and the distance after enlarged is redefined as the distance between the particular station and the zone edge of the particular station. Then, the transmission power corresponding to the distance is determined (step S22). When the overlapping distance is not considered, the distance between the zone edge of the selected base station and the particular station becomes the size of the zone of the particular station.

Figure 13:
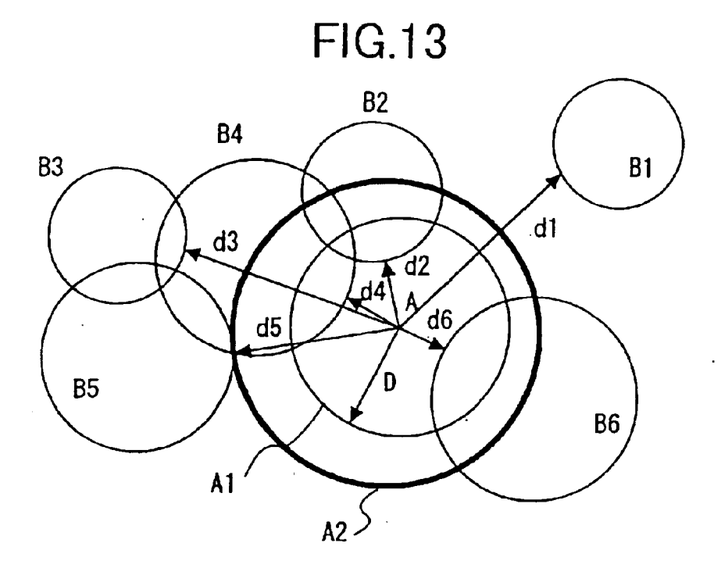
FIG. 13 is a figure for explaining the first example of the zone determining method concretely.

The above-mentioned process will be described with reference to FIG. 13 concretely. FIG. 13 shows an example in which the overlapping distance is not considered where A indicates a position of the particular station. A1 indicates a smallest zone which the particular station can form and D indicates the size. B1–B6 indicate zones of surrounding base stations where d1, d2, . . . indicate distances between zone edges of B1–B6 and the particular station A. In addition, in this figure, it is assumed that the distances between the particular station and the zone edges of the surrounding base stations are d6, d4, d2, d5, d3, d1 in ascending order.

In FIG. 113, since D<d6, D<d4 and D<d2 are satisfied, B6, B4 and B2 are excluded from the subject surrounding base station, and, B5 which has the zone edge nearest to A is selected so that the zone of the particular station is formed in accordance with the zone edge of B5. A2 shows the zone obtained by the above-mentioned zone formation.

Next, another example (second example) for determining the zone (service distance of the particular station) will be described.

Figure 14:
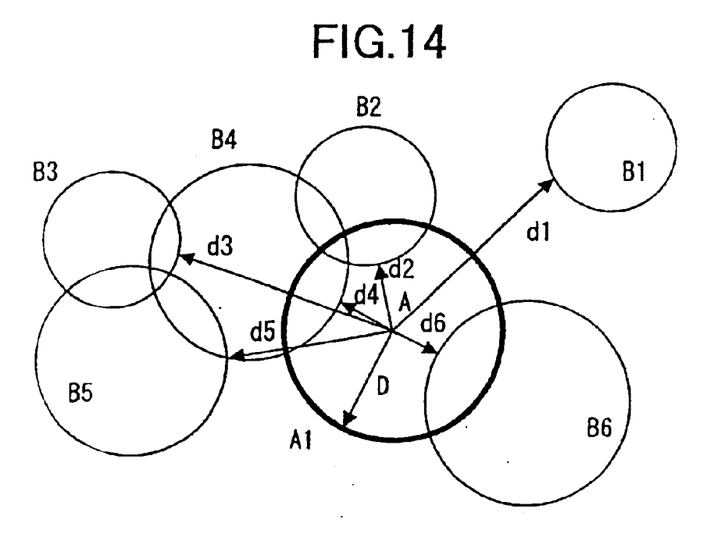
FIG. 14 is a figure for explaining a second example of the zone determining method.

In the second example, the distance D between a edge of a smallest zone which the particular station can form and the particular station is compared with a distance d between the particular station and a zone edge of a surrounding base station. When there are one or more surrounding base stations where D>d is satisfied, the subject base station forms the zone by using the smallest power which the particular station can form. For example, as shown in FIG. 14, since each of d2, d4 and d6 is smaller than D, the particular station forms the zone of the size of D.

Figure 15:
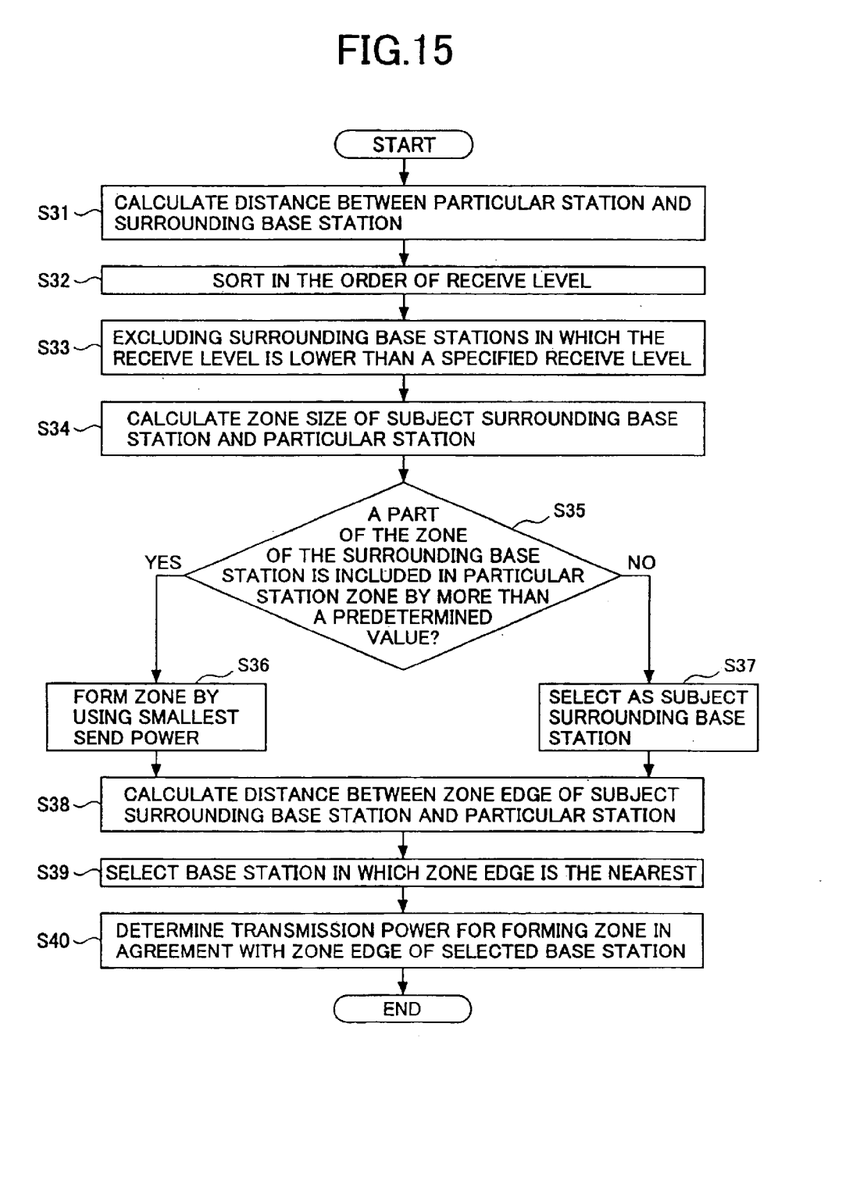
FIG. 15 is a flowchart of the second example of the zone determining method.

FIG. 15 is a flowchart showing procedures in the second example.

In the same way as the first example, from the relationship of the distance R between the particular station and the subject surrounding base stations, the zone size B of the subject surrounding base stations and the zone size D of the particular station, it is judged whether the zone of the surrounding base station reaches the inside of the zone of the particular station (step S31–S35).

When a part of the zone of the surrounding base station is included in the zone edge of the particular station by more than a predetermined value, the particular station forms the zone by the smallest transmission power. "more than a predetermined value" means the same meaning of that in the first example explained with reference to FIG. 13.

When the zone of the surrounding base station is not included within the zone edge of the particular station by more than a predetermined value, the surrounding base station is left as the subject surrounding base station so that the subject surrounding base stations are determined. The process hereinafter is the same as that of the first example explained with reference to FIG. 13 (step S38–40).

In the first and second examples, cases where a round zone is formed by using a nondirectional antenna have been mainly described. However, by using directional antennas and applying the above-mentioned algorithm for each antenna, better effect can be obtained.

That is, when using the directional antennas, the first method is applied for antennas which have wide beam width and the second method is applied for antennas which have narrow beam.

As for the narrow beam, when a zone of the surrounding base station exists within the smallest zone edge of the particular station and within the narrow beam, there is a possibility that an area which is newly covered is small by enlarging the zone of the particular station in which only the overlapping zone is enlarged. On the other hand, when the beam width is wide, even when the zone of the surrounding base station exists in the smallest zone, areas which should be covered may be large. Thus, the possibility that the zone of the particular station should be enlarged becomes high. This corresponds to a case shown in FIG. 11, for example.

Therefore, by selecting a zone formation method to be applied according to the beam width of the antenna, it becomes possible that overlapping becomes small and the covered area becomes large.

As for formation of the zone, the present invention can be realized by a method other than the method in which information of the adjacent base station is obtained and measured in wireless section and the result is used. For example, in a system shown in FIG. 16 where a plurality of base stations are connected to a higher level control station and the base stations receive and send control signals to the control station, a particular station sends a signal on the service area or congestion state to the control station, on the other hand, the particular station receives signals on the service area or the congestion state of surrounding base station from the control station.

Figure 16:
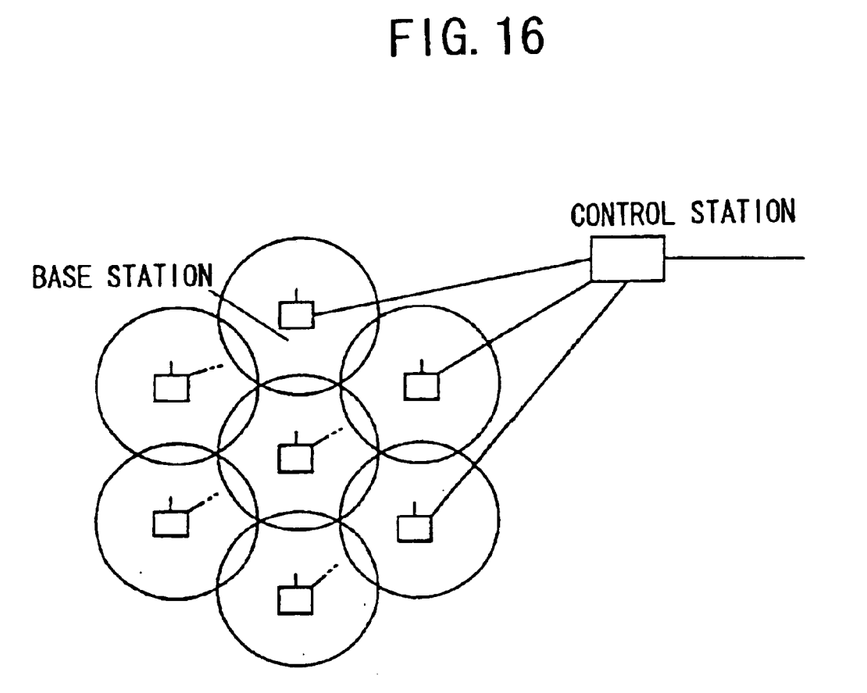
FIG. 16 is a figure showing a configuration of a wireless system having a control station.

In addition, it is possible that, the control station receives signals necessary for forming the zone from the surrounding base stations, and the transmission power, beam shape and the like of the particular base station are calculated according to the above-mentioned flowchart and sent to the antenna/power control part of the base station.

In addition, if the base stations are networked such that the control signals are received and sent when there is not the control station, the particular station can send information of the particular station to the surrounding base stations and receive surrounding information. Therefore, the present invention can be realized regardless of network configuration between the wireless base stations.

In the above-mentioned wireless communication system, it is possible that, a wireless base station detects a service content of the surrounding base station and the wireless base station determines a zone which is the service area of the wireless base station such that the same service is not overlapped in the same service area. The service content can be detected by various methods. For example, the base station sends the detected service content to the control station, and the control station judges whether the service content is the same as a service content which is provided by a particular base station. Then, according to the result of the judgment, the particular base station can determine or change the zone which is the service area.

In addition, by preparing a plurality of patterns of zones which a wireless base station intends to adopt as a service area, it is possible to determine autonomously which pattern is used. It can be determined by using a receive signal, service content and the like. By preparing the patterns, the zone can be determined quickly.

In addition, the wireless communication system of the present invention can be configured such that the above-mentioned wireless base station which autonomously determines the zone is included as a part of the wireless communication system. Accordingly, it becomes possible that flexibility can be provided for the wireless base stations in which the zone is determined fixedly.

According to the present invention, a service area can be determined autonomously and the service area can be changed adaptively while providing a service. According to the autonomous determination of the service area, those can be eliminated to change apparatus information according to environment of the service area and to set installation condition for each apparatus. Thus, the maintenance cost for adding apparatuses can be decreased.

In addition, even when the adjacent wireless base station is congested, it becomes possible that the service can be provided for a part of wireless terminals connected to the adjacent wireless base station by enlarging the service area in the direction of the congested wireless base station by changing the service area on the basis of the congestion state of the surrounding wireless base station. Therefore, the congestion can be relieved, and a service can be started for the wireless terminals which wait for receiving the service, and throughput of wireless terminals to which a service is provided can be improved.

In addition, the service area can be enlarged only when it is necessary, the use efficiency of the frequency can be improved and system capacity used for providing services can be enlarged.

Further, it becomes possible that the zone is determined such that overlapping is small and the cover area is large. Especially, when using the directional antenna, by selecting the process method according to beam width of the antenna, it becomes possible that the zone is determined more accurately such that overlapping is small and the cover area is large.

In the present invention, for example, when a 4G base station like a base of cordless telephone can be operated, there is a possibility in that a service can be provided by a new business model which is different from a service so far.

In addition, according to the present invention, cells of a private area can be formed. Here, it is assumed that the private area is covered as a service area regardless of indoor or outdoor. The private area is, for example, a public space such as a station, an airport and a dome where communication in the area can be provided at no charge for users who use the facilities. In addition, as for various sized building such as an office or a house, communication between terminals in the buildings can be considered. That is, it corresponds to an example where an individual performs data communication in which data is output to a printer from the terminal. Therefore, the private area does not indicates a closed space such as in a house, but means that traffic is communicated within an area. Following service patterns can be considered in such an area. (1) a service is provided by accessing a public network directly like the current i-mode, (2) communication within a private area is not subject to billing and is regarded as communication in a private network like private mode of PHS. The present invention can be used as a cell configuration example for the private area. The cell configuration example for the private area will be described as follows.

Various forms of seamless movement between a private NW and a public NW are considered. The following example is positioned as a cell configuration method in which convenience is improved by providing the private area by a carrier and the service area is easily enlarged by a public service by using private equipment.

First, covering the private area by carrier base stations will be described.

When the cell is configured such that the private area is covered by the carrier, the base stations of the carrier can connect to both of the private network and the carrier network simultaneously. As for communication in the private area, a service is provided by using a part of base stations for private use. In this case, a system different from the public service is necessary in billing, wireless resource usage and quality control.

An example of covering an public area by a user base station will be described next. That is, in the example, base stations covering both of the private area and the public service area are possessed by an "individual" not by the carrier, and private area is covered by a user. By providing the public service of a carrier by using the base stations which are possessed by the individual, the individual can use resources for the private area effectively.

In addition, it becomes possible that the carrier pays a price to the base station provider which provides the public service so that the service area of the carrier can be easily enlarged. That is, when a user other than the carrier possesses base stations in facilities such as a dome stadium, a station, and a restaurant and the like, the public service can be provided in a place where it is difficult to install a base station for the carrier so that it can be expected that the service area can be enlarged. In addition, it becomes possible that seamless communication environment evolved from the current state can be provided.

The present invention is not limited to the specifically disclosed embodiments, and variations and modifications may be made without departing from the scope of the invention.

What is claimed is:

1. A communication apparatus in a wireless communication system having a base station, comprising:
   a part which autonomously forms a zone which is a service area of said base station; and
   a part which determines said zone of said base station on the basis of a first distance between said base station and a zone edge of a surrounding base station, and a second distance between said base station and a zone edge of said base station when transmission power of said base station is smaller.

2. The communication apparatus as claimed in claim 1, further comprising:
   a part which detects that a zone is newly formed around said base station; and
   a part which autonomously changes a zone which is a service area of said base station according to a newly formed zone.

3. The communication apparatus as claimed in claim 1, further comprising:
   a part which detects a congestion state of a surrounding base station of said base station; and
   a part which enlarges a zone which is said service area of said base station according to said congestion state to the direction of said surrounding base station.

4. The communication apparatus as claimed in claim 1, further comprising:
   a part which determines said zone of said base station on the basis of receive quality of a signal received from a surrounding base station of said base station.

5. The communication apparatus as claimed in claim 4, further comprising:
   a part which measures received power or transmission delay of a signal sent to said base station from a surrounding base station;
   a part which calculates a distance between said base station and said surrounding base station on the basis of a result of the measurement; and
   a part which determines said zone which is said service area of said base station on the basis of the result of calculation.

6. The communication apparatus as claimed in claim 4, further comprising:
   a part which measures a bit error rate or a packet error rate from information sent from said surrounding base station to said base station; and
   a part which determines said zone which is said service area of said base station according to a result of the measurement.

7. The communication apparatus as claimed in claim 1, further comprising:
   a part which detects a service content of a surrounding base station by said base station; and
   a part which determines said zone which is said service area of said base station such that the same services as said service do not overlap in the same service area.

8. The communication apparatus as claimed in claim 1, further comprising:
   a part which autonomously determines which pattern is used in which plurality of patterns of said zone which is said service area of said base station are prepared.

9. The communication apparatus as claimed in claim 1, further comprising:
   a part which determines said zone of said base station on the basis of a distance between said base station and a zone edge of a surrounding base station in which said first distance becomes minimum in surrounding base stations except particular surrounding base stations in which a value obtained by subtracting said first distance from said second distance becomes larger than a predetermined value.

10. The communication apparatus as claimed in claim 1, further comprising:
    a part which determines said zone of said base station as a zone formed when transmission power of said base station is minimum if there is a surrounding base station in which a value obtained by subtracting said first distance from said second distance is larger than a predetermined value.

11. The communication apparatus as claimed in claim 1, further comprising:
    a part which determines said zone of said base station on the basis of a distance between said base station and a zone edge of a surrounding base station in which said first distance becomes minimum in surrounding base stations except particular surrounding base stations in which a value obtained by subtracting said first distance from said second distance becomes larger than a predetermined value, when beam width of an antenna used by said base station exceeds a predetermined angle; and
    a part which determines said zone of said base station as a zone formed when transmission power of said base station is minimum if there is a surrounding base station in which a value obtained by subtracting said first distance from said second distance is larger than a predetermined value, when beam width of an antenna used by said base station does not exceed a predetermined angle.

12. The communication apparatus as claimed in claim 1, further comprising:
    a part which obtains said first distance as a value calculated by subtracting the size of a zone of said surrounding base station from a distance between said base station and said surrounding base station; and
    obtains said distance between said base station and said surrounding base station from received power of a signal at said base station sent from said surrounding base station and transmission power of said surrounding base station.

13. A wireless communication system including a plurality of base stations, said wireless communication system including at least a particular base station as only a part of said plurality of base stations, said particular base station including:
    a zone determining part which determines said zone of said base station on the basis of receive quality of a signal received from a surrounding base station of said base station, said zone determining part includes:
       a part which measures received power or transmission delay of signal sent to said base station from said surrounding base station,
       a part which calculates a distance between said base station and said surrounding base station on the basis of a result of the measurement, an
       a part which determines said zone which is said service area of said base station on the basis of the result of the calculation.

14. An autonomous zone forming method of forming a zone which is a service area of a base station in a wireless communication system having said base station, said method comprising the steps of:
    autonomously forming said zone by performing a zone determining step of determining said zone of said base station on the basis of receive quality of a signal received from a surrounding base station of said base station, said zone determining step including:
       measuring received power or transmission delay of a signal sent to said base station from a surrounding base station,
       calculating a distance between said base station and said surrounding base station on the basis of a result of the measurement, and
       determining said zone which is said service area of said base station on the basis of the result of calculation.

15. The autonomous zone forming method as claimed in claim 14, said method further comprising the steps of:
    detecting that a zone is newly formed around said base station; and
    autonomously changing a zone which is said service area of said base station according to a newly formed zone.

16. The autonomous zone forming method as claimed in claim 14, further comprising the steps of:
    detecting a congestion state of a surrounding base station of said base station; and
    enlarging a zone which is said service area of said base station according to said congestion state to the direction of said surrounding base station.

17. The autonomous zone forming method as claimed in claim 14, further comprising the steps of:
    detecting a service content of a surrounding base station by said base station; and
    determining said zone which is said service area of said base station such that the same services as said service do not overlap in the same service area.

18. An autonomous zone forming method of forming a zone which is a service area of a base station in a wireless communication system having said base station, said method comprising the step of:
    autonomously forming said zone by determining said zone of said base station on the basis of a first distance between said base station and a zone edge of a surrounding base station, and a second distance between said base station and a zone edge of said base station when transmission power of said base station is smallest.

19. The autonomous zone forming method as claimed in claim 18, further comprising the step of:
   determining said zone of said base station on the basis of a distance between said base station and a zone edge of a surrounding base station in which said first distance becomes minimum in surrounding base stations except particular surrounding base stations in which a value obtained by subtracting said first distance from said second distance becomes larger than a predetermined value.

20. The autonomous zone forming method as claimed in claim 18, further comprising the step of:
   determining said zone of said base station as a zone formed when transmission power of said base station is minimum if there is a surrounding base station in which value obtained by subtracting said first distance from said second distance is larger than a predetermined value.

21. The autonomous zone forming method as claimed in claim 18, further comprising the steps of:
   determining said zone of said base station on the basis of a distance between said base station and a zone edge of a surrounding base station in which said first distance becomes minimum in surrounding base stations except particular surrounding base station in which a value obtained by subtracting said first distance from said second distance becomes larger than a predetermined value, when beam width of an antenna used by said base station exceeds a predetermined angle; and
   determining said zone of said base station as a zone formed when transmission power of said base station is minimum if there is a surrounding base station in which a value obtained by subtracting said first distance from said second distance is larger than a predetermined value, when beam width of an antenna used by said base station does not exceed a predetermined angle.

22. The autonomous zone forming method as claimed in claim 18, further comprising the steps of:
   obtaining said first distance as a value calculated by subtracting the size of a zone of said surrounding base station from a distance between said base station and said surrounding base station; and
   obtaining said distance between said base station and said surrounding base station from received power of a signal at said base station sent from said surrounding base station and transmission power of said surrounding base station.

23. A communication apparatus in a wireless communication system having a base station, comprising:
   a part which autonomously forms a zone which is a service area of said base station; and
   a zone determining part which determines said zone of said base station on the basis of receive quality of a signal received from a surrounding base station of said base station, said zone determining part including
   a part which measure received power or transmission delay of a signal.

24. A communication apparatus in a wireless communication system having a base station, comprising:
   a part which autonomously forms a zone which is a service area of said base station; and
   a zone determining part which determines said zone of said base station on the basis of receive quality of a signal received from a surrounding base station of said base station, said zone determining part including
   a part which measures a bit error rate or a packet error rate from information sent from said surrounding base station to said base station, and
   a part which determines said zone according to a result of the measurement of the bit error rate or the packet error rate.

* * * * *